C. E. HENNING.
BAIT HOLDER.
APPLICATION FILED SEPT. 22, 1909.
1,003,962.
Patented Sept. 19, 1911.
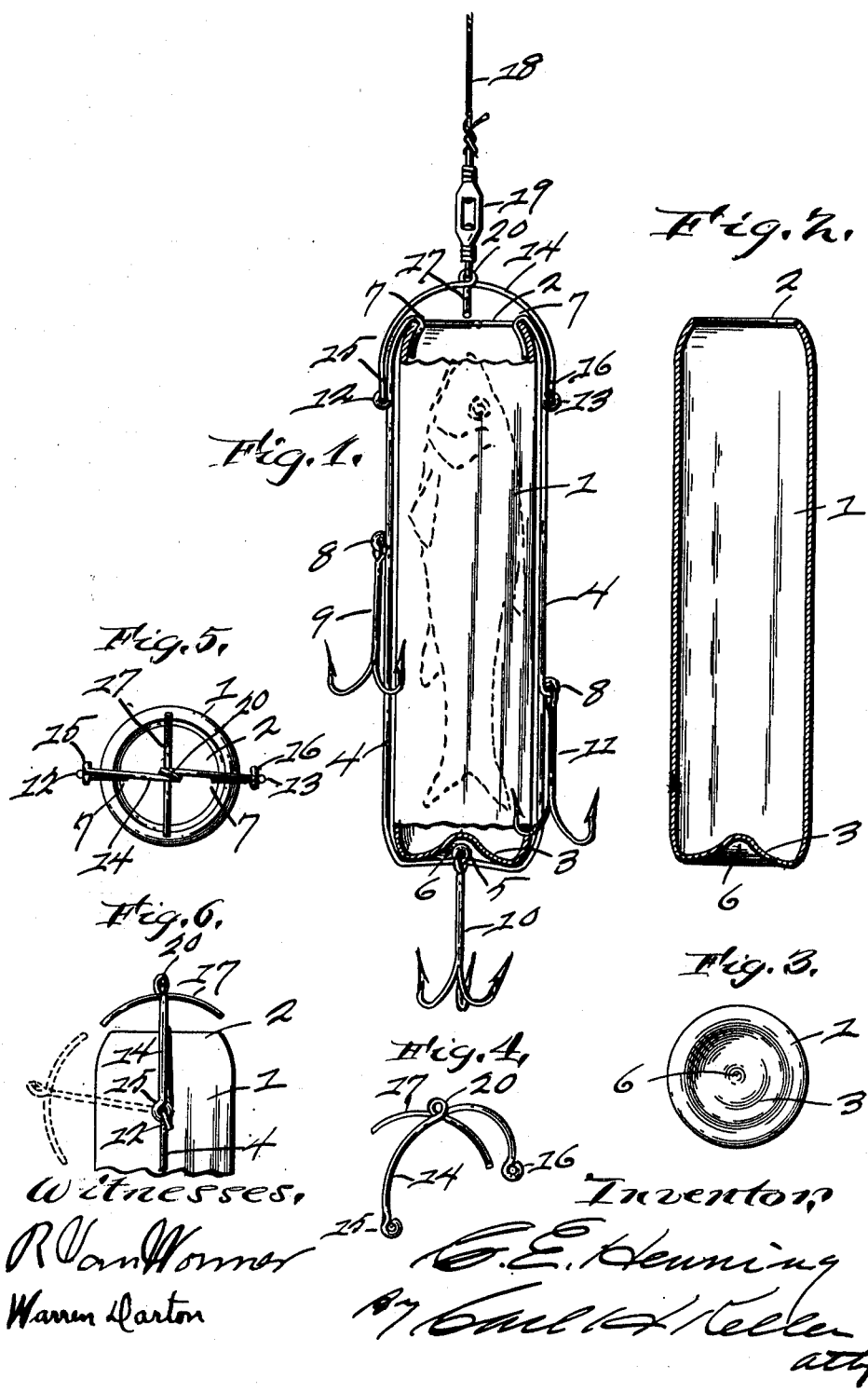

UNITED STATES PATENT OFFICE.

CHESTER E. HENNING, OF BENTON RIDGE, OHIO, ASSIGNOR OF ONE-HALF TO ALLEN J. BALDWIN, OF BENTON RIDGE, OHIO.

BAIT-HOLDER.

1,003,962.

Specification of Letters Patent. Patented Sept. 19, 1911.

Application filed September 22, 1909. Serial No. 519,013.

*To all whom it may concern:*

Be it known that I, CHESTER E. HENNING, a citizen of the United States, residing at Benton Ridge, in the county of Hancock and State of Ohio, have invented certain new and useful Improvements in Bait-Holders; and I do hereby declare the following to be a full, clear, and exact description of the invention, such as will enable others skilled in the art to which it appertains to make and use the same.

This invention has reference to improvements in bait holders and has particular reference to a holder for live bait and especially a live minnow.

The objects of the invention are (1) to provide a transparent holder in which the live bait is confined and protected from injury when attacked by the fish, the bait being at all times visible; (2) to construct the transparent holder for the bait of such form and to so suspend the same that the holder will be constantly filled with water to maintain the bait alive and in fresh condition; (3) to provide automatic means for obstructing the mouth of the transparent holder to prevent the escape of the bait.

With the foregoing objects in view and such others as will appear from the following description, the invention embodies the novel combination, arrangement and details of construction hereinafter shown, described and specifically pointed out in the claims.

In the drawings, Figure 1 is an elevation of the complete device, the glass cylinder being partly in section; Fig. 2 is a longitudinal section of the glass cylinder; Fig. 3 is a view of the bottom of the cylinder; Fig. 4 is a perspective view of the wire bail and the guard carried thereby; Fig. 5 is a plan view of the bail and guard; and Fig. 6 is a side elevation of the bail and guard.

In the accompanying drawings 1 is a transparent glass cylinder, open at the top at 2 and having a closed bottom 3, the same constituting a holder for water and the bait deposited therein through the open top.

4 is a wire frame extending longitudinally on opposite sides of the glass holder and having an eye 5 formed at a central point adapted to extend into a depression 6 in the closed bottom 3, by which the frame is held in position at the closed end of the holder. The ends of the wire at 7 are bent over or hooked upon the margin of the open end of the holder so that the frame is firmly secured against removal to the holder. The wire frame is also provided on opposite sides of the holder with eyes 8 to which and to the eye 5 are secured hooks 9, 10 and 11. At points on opposite sides of the holder and adjacent to the hooked ends 7 are eyes 12 and 13 for the attachment of a wire bail 14 having eyes 15 and 16 at the ends linked into the eyes 12 and 13 so that the bail may be swung to either side of the mouth of the transparent holder.

17 is a cross wire secured by soldering or otherwise to the bail 14 at a central point and transverse to the wire forming the bail. This wire extends on opposite sides of the bail and together with the latter forms an effective obstruction to prevent the escape of the minnow from the holder. Attachment of the fishing line 18 and the usual swivel 19 is made to an eye 20 formed centrally of the bail.

When the device is in use either in still fishing or trolling the mouth of the holder will always be obstructed by the guard and the bail. However when a minnow is to be placed in the holder, the bail and its attached wire guard is moved to one side of the open mouth of the holder, as shown in dotted lines, Fig. 6, so that the mouth of the holder is unobstructed and the minnow is readily introduced. The instant the holder is suspended from the line the bail and attached wire guard will automatically move to a position to obstruct the mouth of the holder, although at all times permitting the free entry of water to the holder.

It will be noted that the holder may be lifted entirely from the water and carried a considerable distance (a common practice in fishing for bass in shallow streams) without injury to the minnow, the holder carrying a sufficient supply of water to maintain the minnow alive. It is obvious that were the glass holder open at the bottom so that the water would escape on its removal from the stream, the minnow would in a short time die for the want of water and by reason of the injuries it would sustain by forcible contact with the walls of the holder.

What I claim is:—

1. In a device of the class described, a transparent cylindrical holder having a closed bottom and an open top, a wire bail pivotally connected with the holder so as to swing over the open top, a guard carried by the bail adapted to normally obstruct the open top, and hooks secured to the outer walls of the holder, substantially as described.

2. In a device of the class described, a cylindrical holder having a closed bottom provided with an indentation, and an open top, a wire frame directed longitudinally on opposite sides of the holder having ends hooked over the margin of the open top of the holder and having an eye which extends into the indentation in the bottom, a wire bail pivotally connected with the frame near the hooked ends, means carried by the bail to normally obstruct the opening into the top of the holder, and hooks secured to the wire frame, substantially as described.

In testimony whereof, I hereunto affix my signature, in presence of two witnesses.

CHESTER E. HENNING.

Witnesses:
ELMER HARPST,
VICTOR H. HARPST.